US009565281B2

(12) United States Patent
Lee et al.

(10) Patent No.: US 9,565,281 B2
(45) Date of Patent: Feb. 7, 2017

(54) WATERPROOF PACKING FOR MOBILE TERMINAL AND MOBILE TERMINAL HAVING THE SAME

(71) Applicant: BLUEBIRD INC., Seoul (KR)

(72) Inventors: Jang Won Lee, Seoul (KR); Young Min Kim, Seoul (KR)

(73) Assignee: BLUEBIRD INC. (KR)

( * ) Notice: Subject to any disclaimer, the term of this patent is extended or adjusted under 35 U.S.C. 154(b) by 112 days.

(21) Appl. No.: 14/315,629

(22) Filed: Jun. 26, 2014

(65) Prior Publication Data
US 2015/0005042 A1    Jan. 1, 2015

(30) Foreign Application Priority Data

Jun. 26, 2013    (KR) .................. 10-2013-0073909

(51) Int. Cl.
*H04M 1/18*    (2006.01)
*H04B 1/3888*    (2015.01)
*H04M 1/02*    (2006.01)
*H04B 1/38*    (2015.01)

(52) U.S. Cl.
CPC ............. *H04M 1/18* (2013.01); *H04B 1/3888* (2013.01); *H04B 2001/3894* (2013.01); *H04M 1/0262* (2013.01)

(58) Field of Classification Search
CPC ............ H04M 1/18; H04M 2001/3894; H04M 1/0262; H04M 1/3888
See application file for complete search history.

(56) References Cited

FOREIGN PATENT DOCUMENTS

| JP | 2013046218 A | 3/2013 |
|---|---|---|
| KR | 0800577 B1 | 1/2008 |
| KR | 20120041604 A | 5/2012 |
| KR | 20130016705 A | 2/2013 |
| KR | 20130051081 A | 5/2013 |

*Primary Examiner* — Dinh P Nguyen

(57) ABSTRACT

Disclosed are a waterproof packing for a mobile terminal and the mobile terminal having the same. According to an embodiment of the present inventive concept, the mobile terminal includes: a terminal main body which includes a plurality of internal components such as a terminal; a terminal rear cover module which is detachably coupled to a rear of the terminal main body and which forms the rear of the terminal main body; and a waterproof packing for the mobile terminal, which is arranged in between the terminal main body and the terminal rear cover module and includes at least one first waterproof wing to prevent water from infiltrating into the terminal main body through a gap between the terminal main body and the terminal rear cover module.

15 Claims, 13 Drawing Sheets

WATERPROOF PACKING FOR MOBILE TERMINAL AND MOBILE TERMINAL HAVING THE SAME

CROSS-REFERENCE TO RELATED APPLICATIONS

This application claims the benefit of Korean Patent Application No. 10-2013-0073909 filed on Jun. 26, 2013, in the Korean Intellectual Property Office, the disclosure of which is incorporated herein in its entirety by reference.

BACKGROUND

The inventive concept relates to a waterproof packing for a mobile terminal and a mobile terminal having the same, and more particularly to a waterproof packing for a mobile terminal and a mobile terminal having the same, which has an efficient structure for preventing water from infiltrating into a terminal main body without extensively changing a structure.

A mobile terminal is a terminal that can be freely used while moving anywhere, and representatively includes a mobile communication terminal such as a cellular phone, and personal digital assistant (PDA) called a personal portable terminal, etc.

Therefore, a term of 'the mobile terminal' used herein refers to all of them, but the following descriptions are limited to the PDA for the convenience.

In complicated and diverse society, individuals have needed to keep or maintain his/her own information, and various products have been released in the market in order to meet such individual needs. One of them is the PDA.

The PDA is also called a pocket computer, which is a general term for a palm-sized small device having functions of calculation, information storage and search for personal or business use. Occasionally, the PDA is mainly used for keeping schedule calendar, address book information, etc.

In particular, a personal portable terminal (PDA) for industrial use has been widely spread for physical distribution industry, and its market has been gradually expanded.

The industrial PDA has various functions such as a barcode scanner, a card payment device, etc. that are not given to a general PDA, and is advantageously efficient to perform delivery, data management, related business, etc.

For example, in the case of an insurance company, an insurance planner may use an industrial PDA to directly process customer information management, customer searching, scheduling, consultation diary management, anniversary searching, fund statement processing, and the like various insurance-related business on the site. In the case of a hospital, a medical team may use a portable industrial PDA to input or search an X-ray image or the like image and graphic data as well as a patient's medical record and history and prescription anytime and anywhere. Also, in the case of the police, a traffic or anticrime policeman may use a industrial PDA to do a outdoor crackdown, and it is thus possible to remarkably shorten time in the outdoor crackdown since a traffic fine, which is currently payable two or three days later after the crackdown, can be directly paid to banking facilities.

As we know from the foregoing description that the industrial PDA has been used in various industrial fields, the industrial PDA has to meet requirements higher than a certain level to withstand not general environments but industrial environments on the contrary to the general PDA.

That is, it is easy to figure out that the industrial PDA may be used in a cold storage at ten degrees below zero or used for a long time in the open air on the contrary to the general PDA. Also, a postman or the like user may ride roughshod over the industrial PDA on business. Therefore, the industrial PDA is competitive as a product when it has shock resistance, waterproofing, heat/cold resistance, etc. to some extent.

Like this, the industrial PDA has to not only be more sturdily made than the general PDA but also necessarily have a waterproof function to be proof against snow or rain. Therefore, the industrial PDA is significantly larger than the general PDA because it is designed to satisfy the requirements such as shock resistance, waterproofing, heat/cold resistance, etc. higher than a certain level and involve the barcode scanner or the like as described above. Accordingly, it is inconvenient for Asians, who have smaller hands than Westerners, to grab the industrial PDA, and there is a need of reducing the size of the industrial PDA.

Meanwhile, there is an example that a conventional mobile terminal employs a rubber packing having a simple annular shape for the waterproof function.

Such a rubber packing is mostly shaped like a ring having a circular cross-section, and generally arranged in between a terminal main body and a terminal rear cover module to prevent water from infiltrating into a terminal exposing area in the terminal main body.

In practice, when the battery is separated, terminals to electrically contact the battery are exposed so that a subscriber identification module (SIM) card or the like can be inserted in a back area of the terminal main body. If water infiltrates into the terminal exposure area, malfunctions may arise. Therefore, this area has to necessarily have the waterproof structure.

However, in the case of the conventional mobile terminal that has been on the market or will be released is vulnerable to water due to its structural limit, and thus water is likely to infiltrate into the inside of the terminal main body.

Nevertheless, it is not preferable in terms of the structure and costs if the waterproof function is given by extensively changing the structure of the mobile terminal. Accordingly, the mobile terminal has to be efficiently made up for the waterproof structure.

SUMMARY

The present inventive concept is to provide a waterproof packing for a mobile terminal and a mobile terminal having the same, which has an efficient structure for preventing water from infiltrating into a terminal main body without extensively changing a structure.

According to an aspect of the present inventive concept, there is provided a mobile terminal including: a terminal main body which includes a plurality of internal components such as a terminal; a terminal rear cover module which is detachably coupled to a rear of the terminal main body and which forms the rear of the terminal main body; and a waterproof packing for the mobile terminal, which is arranged in between the terminal main body and the terminal rear cover module and includes at least one first waterproof wing to prevent water from infiltrating into the terminal main body through a gap between the terminal main body and the terminal rear cover module.

The terminal rear cover module may include a battery module which supplies power to internal components of the terminal main body.

The battery module may include a battery which is inserted in a module mounting space formed in the rear of the terminal main body; and a battery support cover which is detachably coupled to the rear of the terminal main body, and supports the battery as being provided integrally with or separately from the battery.

The waterproof packing for a mobile terminal may further include a packing plate which is shaped like a rectangular loop continuously arranged along a circumferential direction of the terminal rear cover module, and placed at one of the terminal main body and the terminal rear cover module to support the first waterproof wing.

A seating groove for placing the packing plate may be formed in a back of the terminal main body facing the terminal rear cover module.

The packing plate may be integrally coupled to a front of the terminal rear cover module facing the terminal main body.

The first waterproof wing may include: a first inclined pressing barrier inclined toward one side with respect to the packing plate, and compressed toward the packing plate and forming a barrier for preventing water infiltration when the terminal rear cover module is locked to the terminal main body; and a first flange type barrier arranged in parallel with the packing plate at an end of the first inclined pressing barrier and forming a barrier for preventing water infiltration.

The waterproof packing for a mobile terminal may further include at least one second waterproof wing connected to the packing plate and forming a barrier with respect to water passed by the first waterproof wing.

The second waterproof wing may include a second inclined pressing barrier inclined toward the other side with respect to the packing plate, and compressed toward the packing plate and forming a barrier for preventing water infiltration when the terminal rear cover module is locked to the terminal main body; and a second flange type barrier arranged in parallel with the packing plate at an end of the second inclined pressing barrier and forming a barrier for preventing water infiltration.

The first waterproof wing and the second waterproof wing may be symmetrically arranged on the packing plate.

A V-shaped groove may be formed in between the first waterproof wing and the second waterproof wing, and a projection may protrude from one of the terminal main body and the terminal rear cover module and partially inserted in the V-shaped groove.

At least one of the first waterproof wing and the second waterproof wing may include at least one semicircular projection rib in an area thereof to be in line-contact with the terminal rear cover module.

Many first and second waterproof wings may be arranged on the packing plate.

According to an aspect of the present inventive concept, there is provided a waterproof packing for a mobile terminal, including: at least one first waterproof wing which is arranged between a terminal main body and a terminal rear cover module detachably coupled to a rear of the terminal main body and forming the rear of the terminal main body, and prevents water from infiltrating into the terminal main body through a gap between the terminal main body and the terminal rear cover module; and a packing plate which is provided at one of the terminal main body and the terminal rear cover module, supports the first waterproof wing, and is continuously arranged long a circumferential direction of the terminal rear cover module.

The terminal rear cover module may include a battery module which supplies power to internal components of the terminal main body, the battery module including: a battery which is inserted in a module mounting space formed in the rear of the terminal main body; and a battery support cover which is detachably coupled to the rear of the terminal main body, and supports the battery as being provided integrally with or separately from the battery.

The packing plate may be integrally coupled to a front of the terminal rear cover module facing the terminal main body.

The first waterproof wing may include: a first inclined pressing barrier inclined toward one side with respect to the packing plate, and compressed toward the packing plate and forming a barrier for preventing water infiltration when the terminal rear cover module is locked to the terminal main body; and a first flange type barrier arranged in parallel with the packing plate at an end of the first inclined pressing barrier and forming a barrier for preventing water infiltration.

The waterproof packing for a mobile terminal may further include at least one second waterproof wing connected to the packing plate and forming a barrier with respect to water passed by the first waterproof wing.

The second waterproof wing may includes a second inclined pressing barrier inclined toward the other side with respect to the packing plate, and compressed toward the packing plate and forming a barrier for preventing water infiltration when the terminal rear cover module is locked to the terminal main body; and a second flange type barrier arranged in parallel with the packing plate at an end of the second inclined pressing barrier and forming a barrier for preventing water infiltration.

The first waterproof wing and the second waterproof wing may be symmetrically arranged on the packing plate, and a V-shaped groove may be formed in between the first waterproof wing and the second waterproof wing and receive a projection protruding from a surface of one of the terminal main body and the terminal rear cover module.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
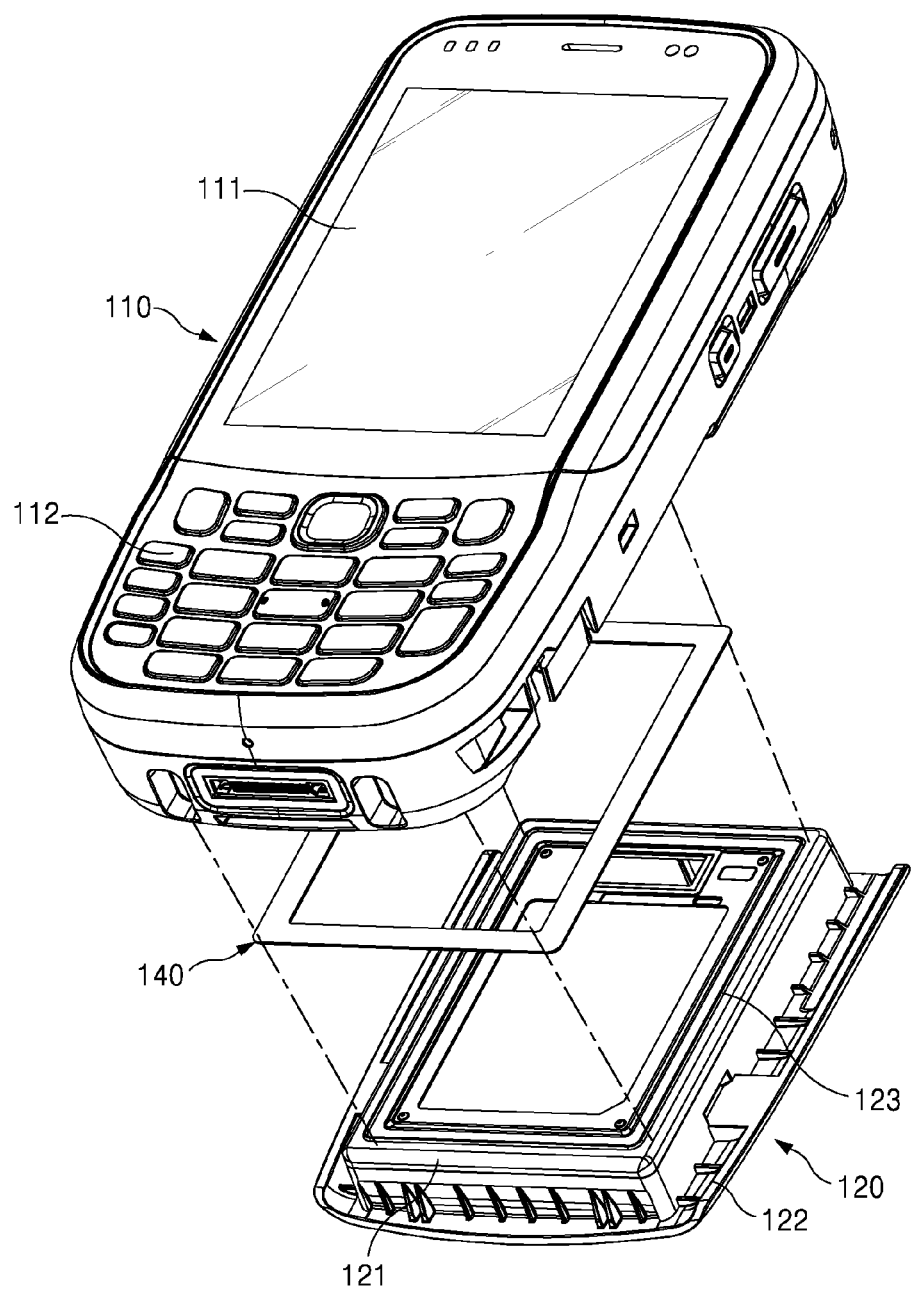
FIG. 1 is an exploded perspective view of a mobile terminal according to a first embodiment of the present inventive concept.

The attached drawings for illustrating embodiments of the inventive concept are referred to in order to gain a sufficient understanding of the inventive concept and the merits thereof.

Hereinafter, the inventive concept will be described in detail by explaining embodiments of the inventive concept with reference to the attached drawings. Like reference numerals in the drawings denote like elements.

Figure 2:
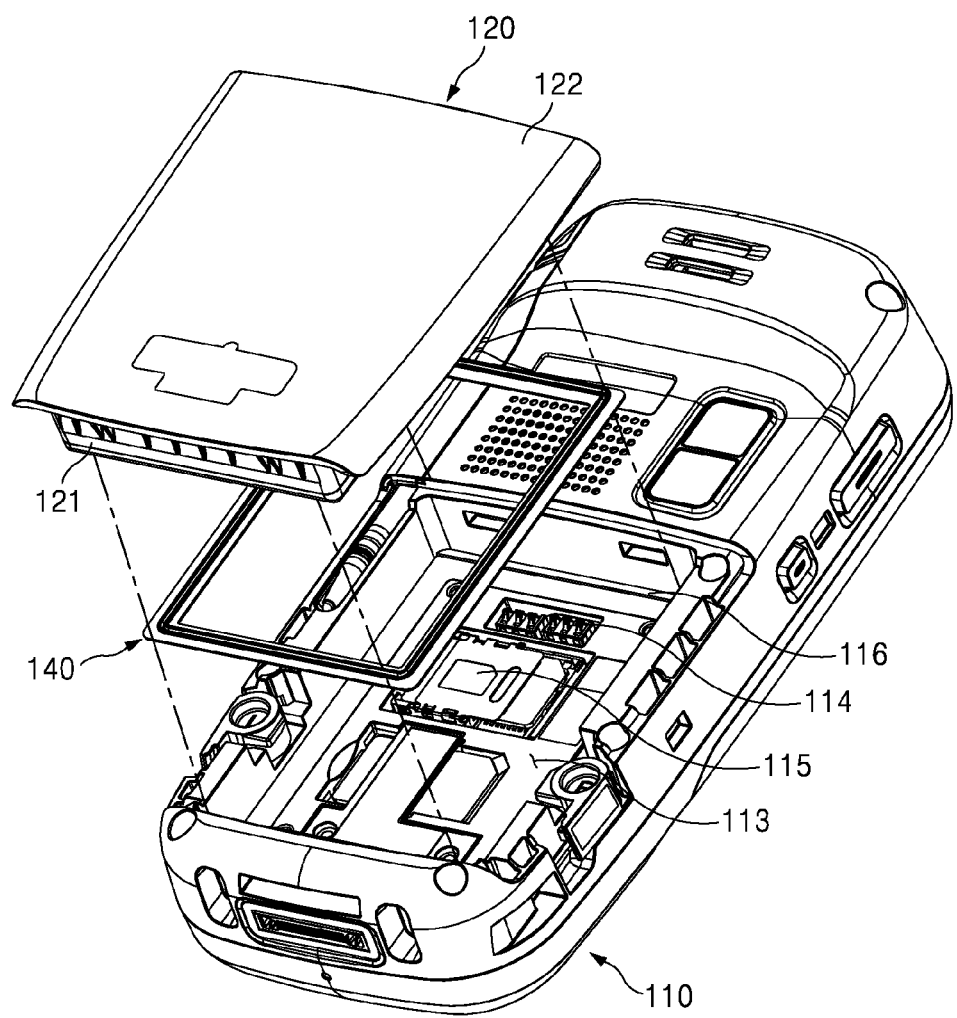
FIG. 2 is a view showing the mobile terminal of FIG. 1 on an opposite side.
Figure 3:
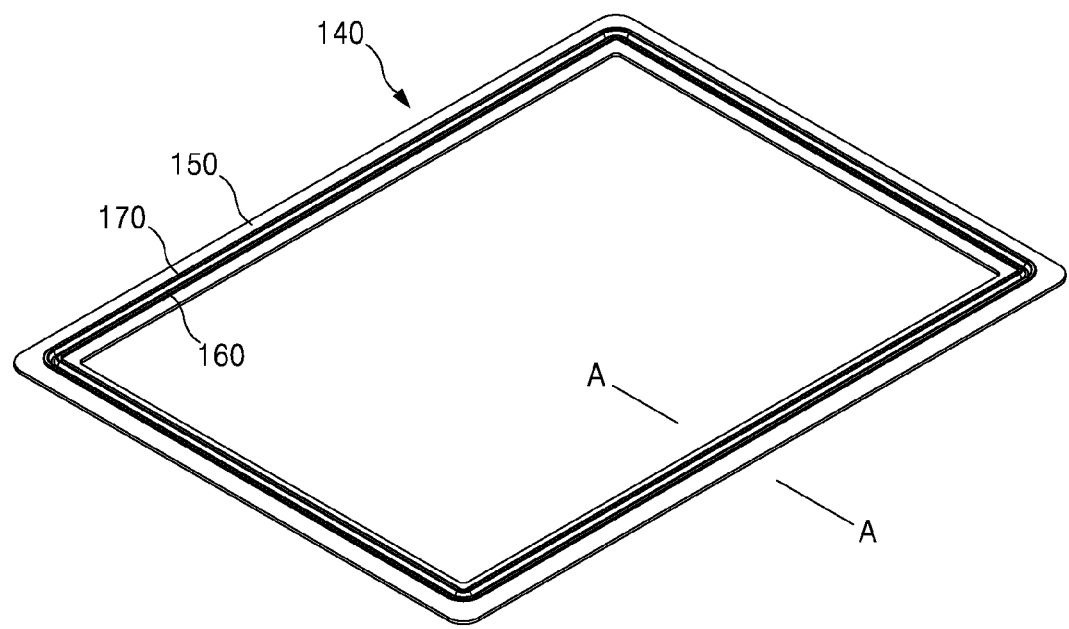
FIG. 3 is a perspective view of waterproof packing for the mobile terminal.
Figure 4:
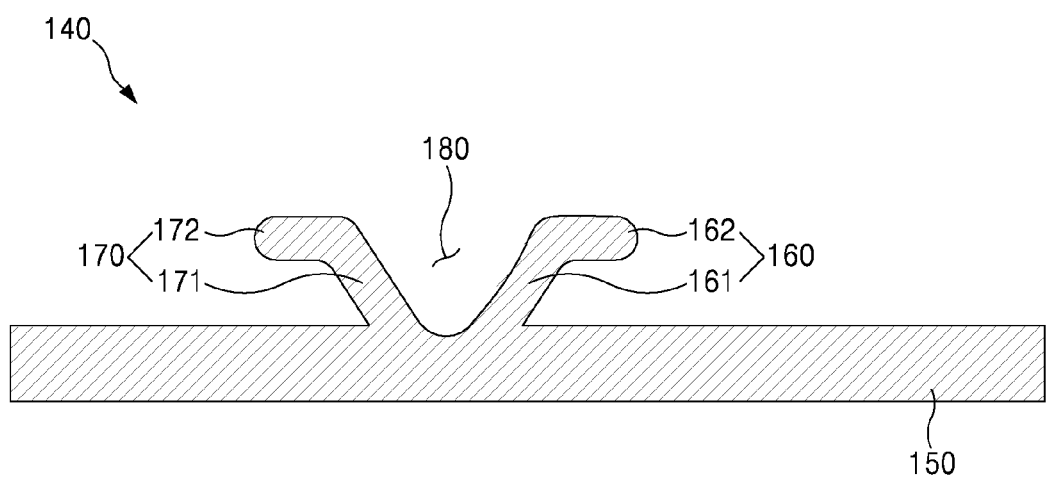
FIG. 4 is a cross-section view taken along line A-A of FIG. 3.
Figure 5:
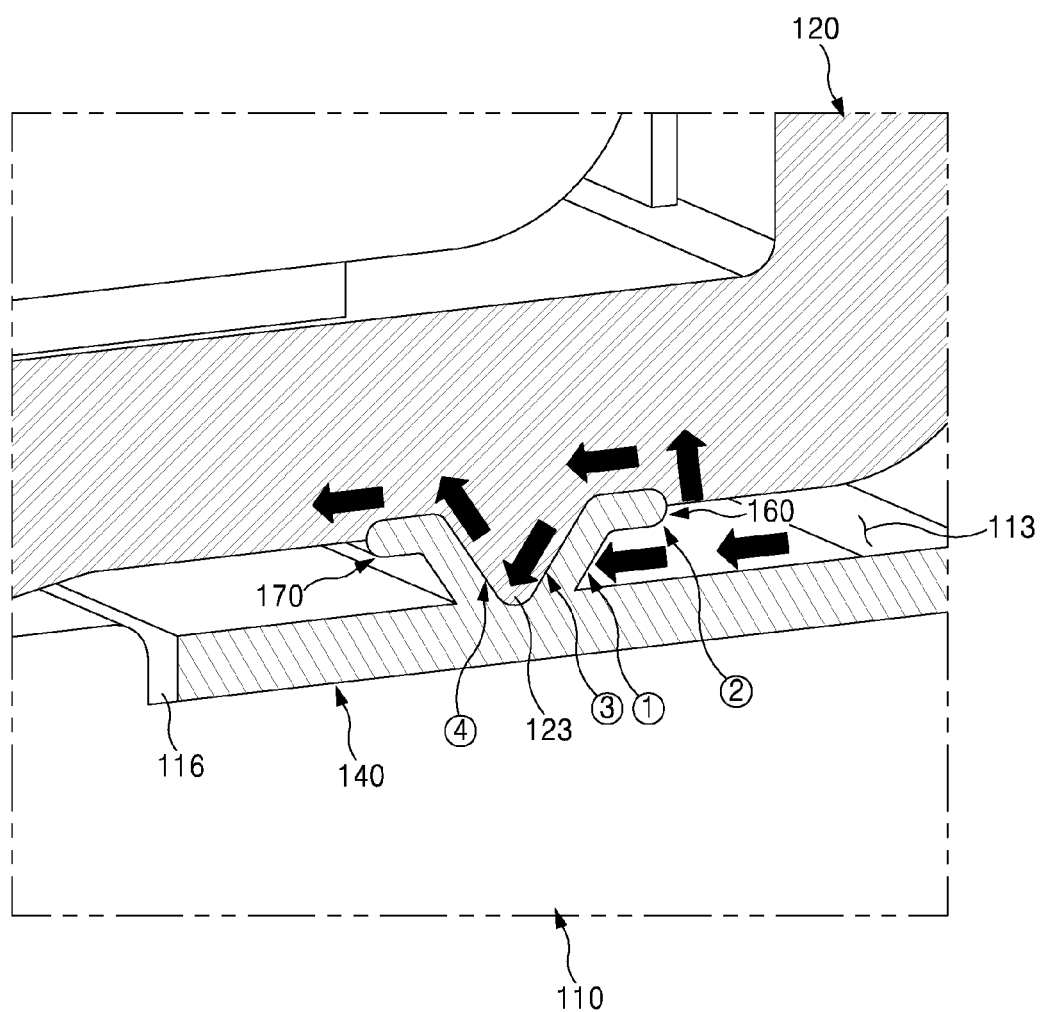
FIG. 5 is a view for explaining operations of the waterproof packing for the mobile terminal.
Figure 6:
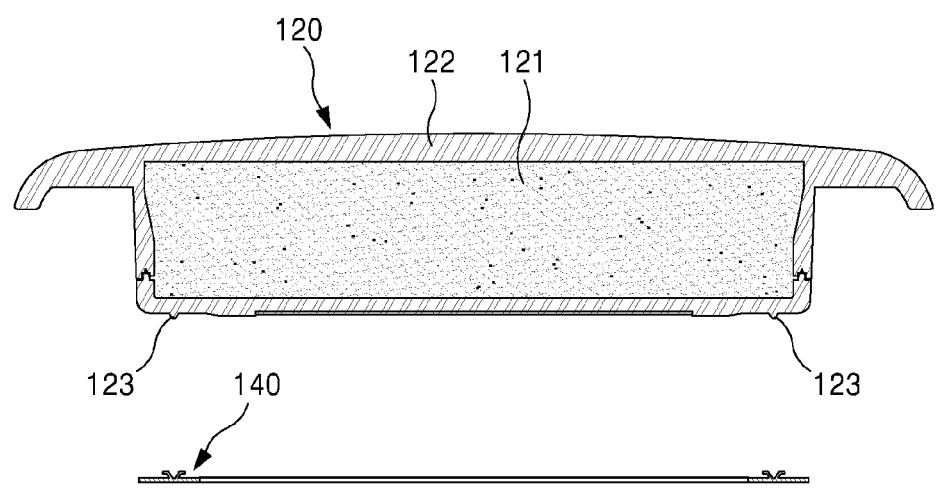
FIGS. 6 to 8 are views for showing use of the waterproof packing for the mobile terminal in stages.
Figure 6:
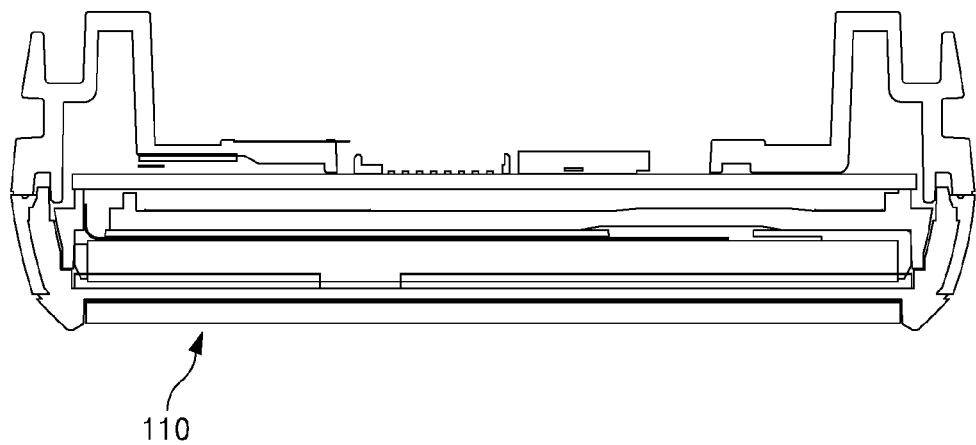
Figure 7:
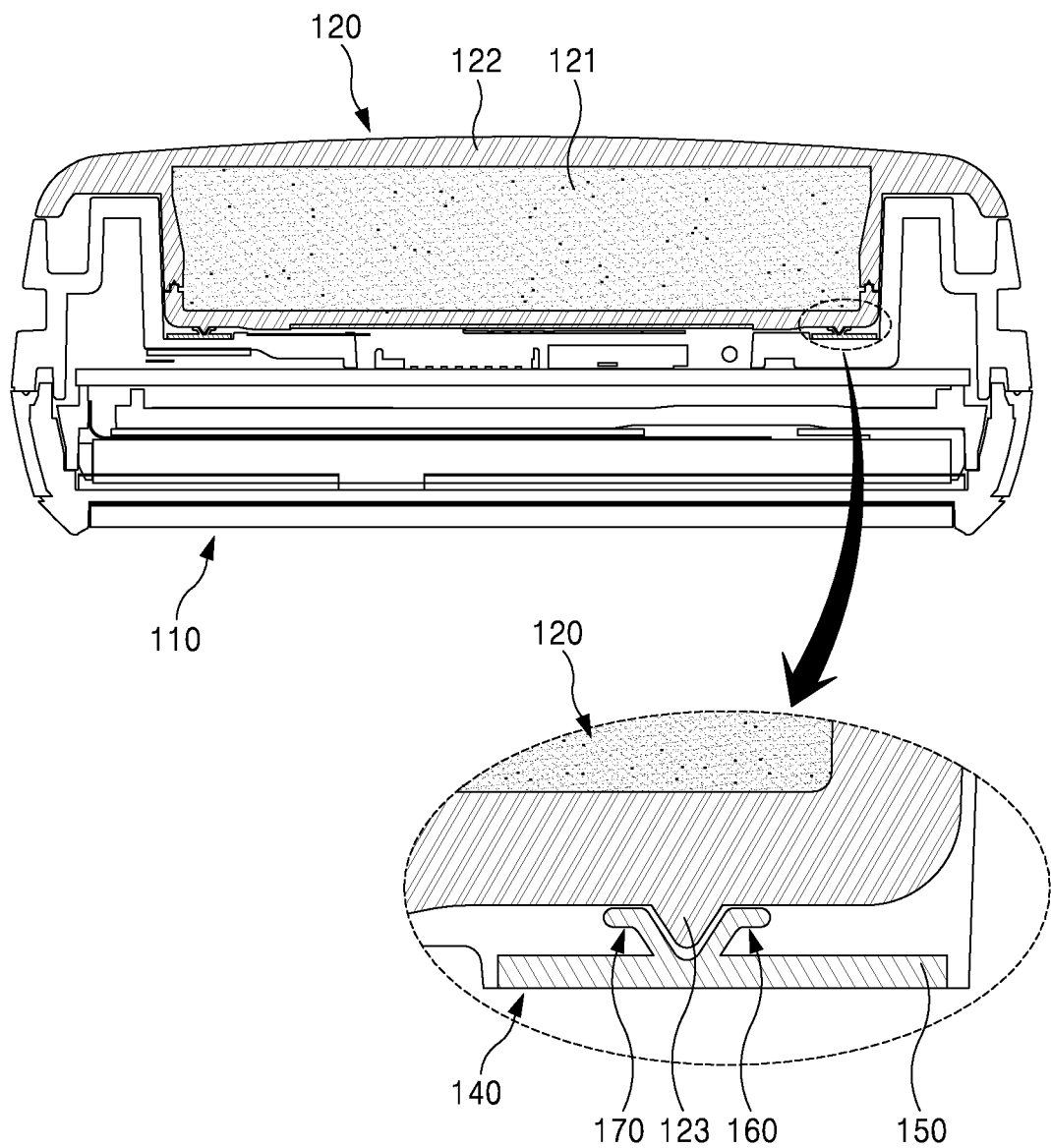
Figure 8:
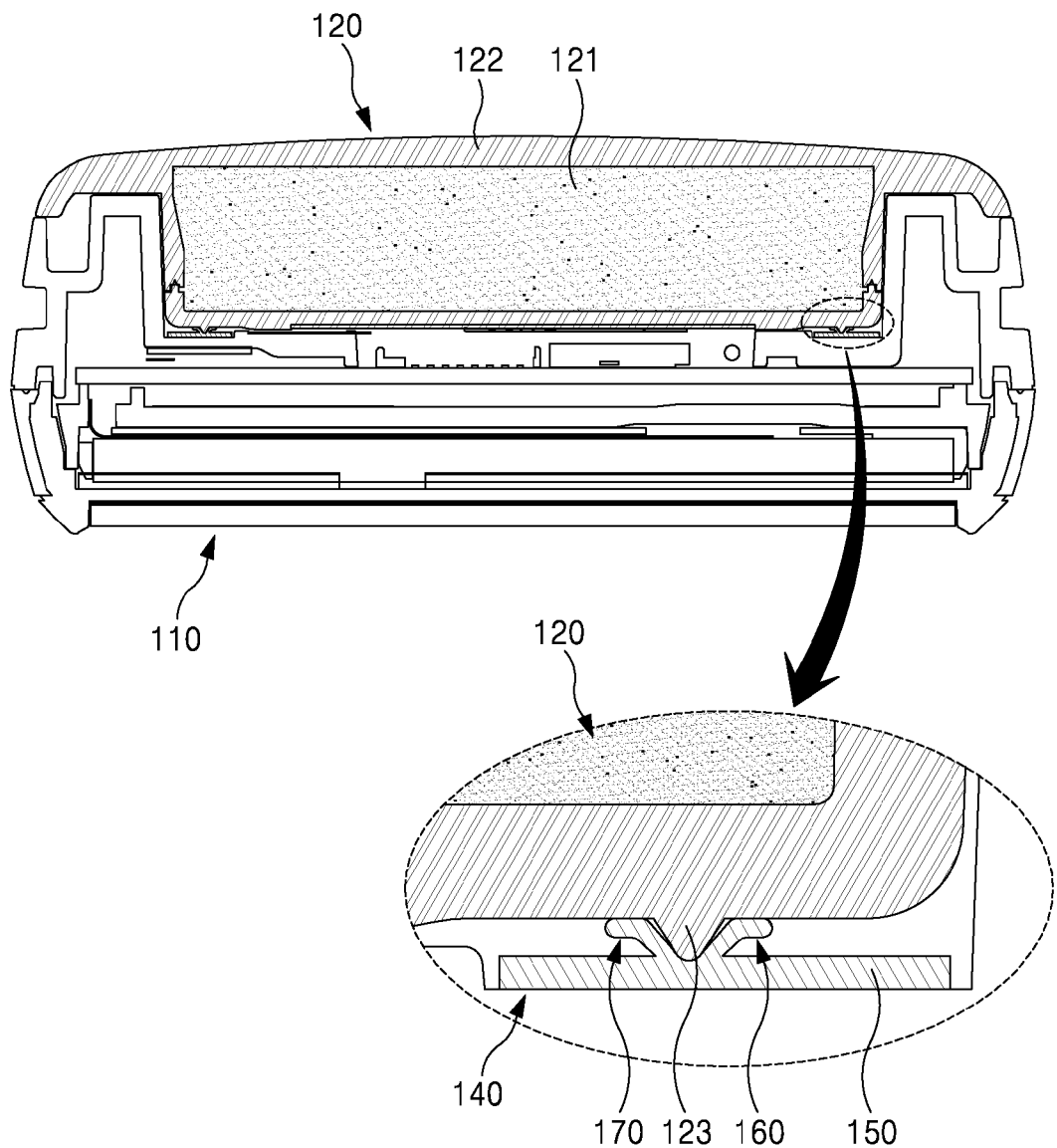

FIG. 1 is an exploded perspective view of a mobile terminal according to a first embodiment of the present inventive concept, FIG. 2 is a view showing the mobile terminal of FIG. 1 on an opposite side, FIG. 3 is a perspective view of waterproof packing for the mobile terminal, FIG. 4 is a cross-section view taken along line A-A of FIG. 3, FIG. 5 is a view for explaining operations of the waterproof packing for the mobile terminal, and FIGS. 6 to 8 are views for showing use of the waterproof packing for the mobile terminal in stages.

As shown therein, the mobile terminal according to this embodiment is improved in waterproof performance through an efficient structure without changing its structure, which includes a terminal main body 110, a terminal rear cover module 120, and a waterproof packing for the mobile terminal 140.

The terminal rear cover module 120 is detachably coupled to a rear of the terminal main body 110 and forms the rear of the terminal main body 120. Therefore, the terminal rear cover module 120 may be a simple rear cover (not shown), or may be the battery module 120 including a battery 121 and a battery support cover 122 (to be described later). For convenience of description, the terminal rear cover module 120 will be described below as the battery module 120, but not limited thereto.

As the battery module 120, the terminal rear cover module 120 is detachably coupled to the rear of the terminal main body 110, in which the waterproof packing for the mobile terminal 140 according to this embodiment is first coupled and then the battery module 120 is coupled, thereby improving the waterproof performance as compared with a conventional one. In particular, not the conventional simple packing but the waterproof packing for the mobile terminal 140 is enough to double the waterproof performance.

Prior to description of the waterproof packing for the mobile terminal 140, the terminal main body 110 will be first described.

In this embodiment, the terminal main body 110 refers to all parts except the battery module 120 and the waterproof packing for the mobile terminal 140, that is, includes many internal components and its outer case.

Referring to FIGS. 1 and 2, the terminal main body 110 is formed with a liquid crystal display 111 and a keypad 112 in the front thereof.

The terminal main body 110 in this embodiment may be a terminal main body 110 of a personal digital assistant (PDA) for business use, but not limited thereto.

Of course, this is nothing but an example. Therefore, the terminal main body 110 does not have to be the PDA for the business use. For example, the terminal main body 110 may be a main body of a widely spread smart phone, or may be an old second generation (2G) phone such as a folder phone, a slide phone, etc.

On the rear of the terminal main body 110, a module mounting space 113 is formed to mount the battery module 120 thereto. The module mounting space 113 is shaped like a groove into which the battery module 120 is partially inserted and mounted.

The module mounting space 113 includes a plurality of terminals 114 protruding from an inner center region thereof.

The terminals 114 electrically contact the battery module 120. In the vicinity of the terminals 114, a slot 115 is provided to mount a subscriber identification module (SIM) card or the like thereto.

Meanwhile, as described above, the battery module 120 used as the terminal rear cover module 120 is to supply power to the internal components of the terminal main body 110 and locked to or unlocked from the module mounting space 113 on the rear of the terminal main body 110. The battery module 120 is rechargeable.

The battery module 120 includes a battery 121 inserted in the module mounting space 113 on the rear of the terminal main body 110 and electrically contacting the terminal 114, and a battery support cover 122 including the battery 121. In this embodiment, the battery support cover 122 is injection-molded to surround the entire circumference of the battery 121 so as to insert the battery 121 therein. In result, this embodiment shows the battery module 120 in which the battery 121 and the battery support cover 122 are integrated.

The battery module 120 is to obviate inconvenience that the battery 121 and the battery support cover 122 are assembled and disassembled.

Alternatively, without limitation, the present inventive concept may be applied to a terminal like a typical smart phone, where the battery 121 and the battery support cover 122 are individually provided and separated from each other.

Meanwhile, as described above, the terminal main body 110 includes many internal components such as the terminals 114. If water infiltrates into the inside of the terminal main body 110, particularly, into the terminals 114 exposed to the rear of the terminal main body 110, a short circuit may be caused and thus malfunctions of a device are likely to arise.

Accordingly, there is a need of preventing external water from infiltrating into an area to which the terminals 114 of the terminal main body 110 are exposed. To this end, the waterproof packing for the mobile terminal 140 is provided.

In this embodiment, the waterproof packing for the mobile terminal 140 is placed in between the terminal main body 110 and the battery module 120 and prevents water from infiltrating into the terminal main body 110 through a gap between the terminal main body 110 and the battery module 120.

The waterproof packing for the mobile terminal 140 includes a packing plate 150 placed at the side of the terminal main body 110, a first waterproof wing 160 protruding from one side of the surface of the packing plate 150, and a second waterproof wing 170 protruding from the other side of the surface of the packing plate 150 and symmetrical to the first waterproof wing 160.

The packing plate 150 is shaped like a rectangular loop continuously formed along the battery module 120, that is, along the circumferential direction of the battery 121. In other words, the packing plate 150 is arranged in the form of a quadrangle along the circumferential direction of the battery 121 at corners of the module mounting space 113 on the rear of the terminal main body 110.

To facilitate the packing plate 150 to be arranged in place, a seating groove 116 is formed to place the packing plate 150 on the rear of the terminal main body 110.

The seating groove 116 is recessed on the rear of the terminal main body 110 in the form of approximately the same shape as the packing plate 150. Thus, it is easy to arrange and assemble the packing plate 150 in place through the seating groove 116.

In this embodiment, both the first waterproof wing 160 and the second waterproof wing 170 have the same shape and are symmetrical to each other on the packing plate 150.

Accordingly, a V-shaped groove 180 is formed in between the first waterproof wing 160 and the second waterproof wing 170, and a projection 123 corresponding to the V-shaped groove 180 protrudes on the battery 121 of the battery module 120.

Thus, when the waterproof packing for the mobile terminal 140 is coupled to the corner areas of the module mounting space 113 on the rear of the terminal main body 110 and then the battery module 120 is fitted and locked to the module mounting space 113, the projection 123 of the battery module 120 is placed in the V-shaped groove 180 between the first waterproof wing 160 and the second waterproof wing 170 and presses the waterproof packing for the mobile terminal 140, thereby improving the waterproof performance.

Of course, the waterproof packing for the mobile terminal 140 in this embodiment has a structure that the V-shaped groove 180 is formed in between the first waterproof wing 160 and the second waterproof wing 170, and therefore the projection 123 is formed in the battery module 120 corresponding to the V-shaped groove 180. However, a battery module (not shown) may be provided without the projection 123.

That is, even though the projection 123 is not provided in the battery module, the surface of the battery module presses the waterproof packing for the mobile terminal 140, thereby efficiently preventing water from infiltrating into the areas of the terminals 114 through the waterproof packing for the mobile terminal 140.

First, the first waterproof wing 160 is as follows. The first waterproof wing 160, includes a first inclined pressing barrier 161 inclined toward one side with respect to the packing plate 150, and compressed toward the packing plate 150 and forming a bather for preventing water infiltration when the battery module 120 is locked to the terminal main body 110, and a first flange type barrier 162 arranged in parallel with the packing plate 150 at an end of the first inclined pressing barrier 161 and forming a barrier for preventing water infiltration.

In this exemplary embodiment, both the first waterproof wing 160 and the second waterproof wing 170 have the same shape, and therefore the second waterproof wing 170 also includes a second inclined pressing barrier 171 and a second flange type barrier 172.

Since both the first waterproof wing 160 and the second waterproof wing 170 have the same shape and size, it is convenient to manufacture them and it is possible to equivalently maintain the contact with the battery module 120, thereby improving waterproof performance.

In more detail, as shown in FIG. 5, the waterproof packing for the mobile terminal 140 has the structure that the first waterproof wing 160 and the second waterproof wing 170 are symmetrically formed with the V-shaped groove 180 therebetween, and the first and second waterproof wings 160 and 170 respectively include the first and the second inclined pressing barriers 161 and 171 and the first and second flange type barriers 162 and 172. Therefore, water that possibly infiltrates into the terminal main body 110 does not flow following the arrows shown in FIG. 5, but is difficult to infiltrate into the terminal main body 110 as it is obstructed at the point areas from ① to ④. Accordingly, the waterproof performance is doubled to thereby improve stability and durability of a product.

Below, operations of the mobile terminal according to an embodiment of the present inventive concept will be described.

In the state that the terminal main body 110, the waterproof packing for the mobile terminal 140 and the battery module 120 are separated as shown in FIG. 6, the waterproof packing for the mobile terminal 140 is coupled to the corner areas of the module mounting space 113 on the rear of the terminal main body 110 as shown in FIG. 7 and then the battery module 120 is inserted in the module mounting space 113.

Then, as shown in FIG. 8, the battery module 120 is locked to the terminal main body 110 while pressing the battery module 120 toward the terminal main body 110.

While the battery module 120 is pressed toward the terminal main body 110, the projection 123 of the battery module 120 is placed in the V-shaped groove 180 between the first waterproof wing 160 and the second waterproof wing 170 and presses the waterproof packing for the mobile terminal 140, and at the same time the first and second waterproof wings 160 and 170 are in close contact with the battery module 120 as being opened outward and compressed toward the packing plate 150. Therefore, external water does not flow following the arrows shown in FIG. 5, but is difficult to infiltrate into the terminal main body 110 since it is obstructed at the point areas from ① to ④.

Accordingly, the waterproof performance is doubled to thereby improve stability and durability of a product.

Figure 9:
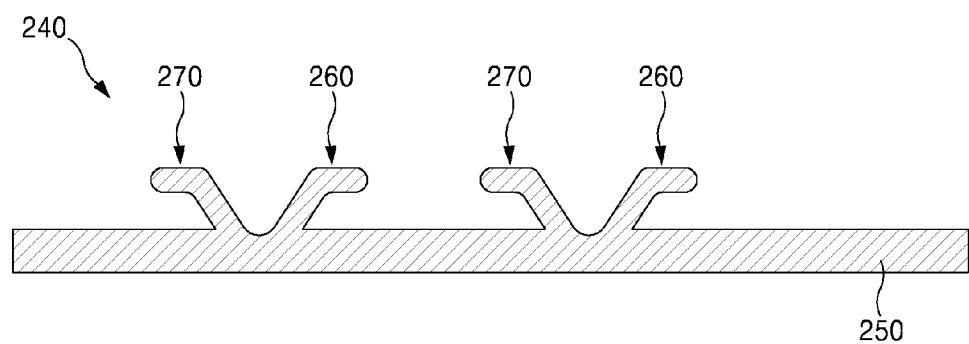
FIG. 9 is a partial cross-section view of waterproof packing for the mobile terminal according to a second embodiment of the present inventive concept.

With this efficient structure and operations, it is possible to prevent water from infiltrating into the terminal main body 110 without extensively changing a structure FIG. 9 is a partial cross-section view of waterproof packing for the mobile terminal according to a second embodiment of the present inventive concept.

As shown therein, the waterproof packing for the mobile terminal 240 includes a plurality of first and second waterproof wings 260 and 270 arranged on the packing plate 250. Such a structure has many points for preventing water from infiltration, thereby making water infiltration more difficult.

With this structure, it is also possible to prevent water from infiltration without extensively changing a structure.

Figure 10:
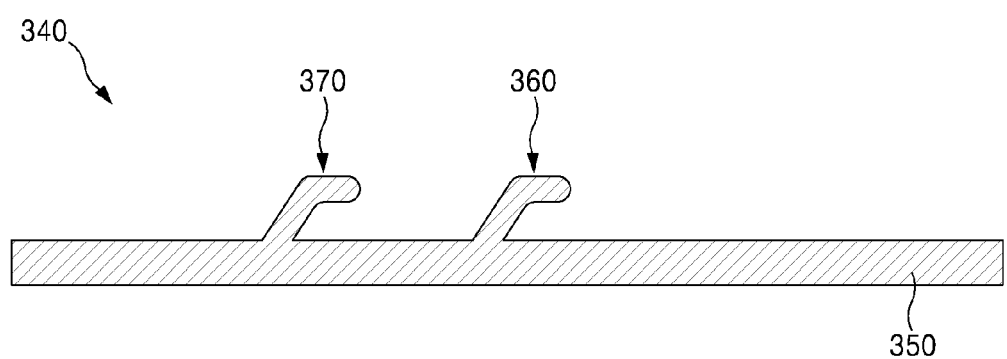
FIG. 10 is a partial cross-section view of waterproof packing for the mobile terminal according to a third embodiment of the present inventive concept.

FIG. 10 is a partial cross-section view of waterproof packing for the mobile terminal according to a third embodiment of the present inventive concept;

As shown therein, the waterproof packing 340 for the mobile terminal according to an embodiment of the present inventive concept includes a first waterproof wing 360 and a second waterproof wing 370 arranged on a packing plate 350 and oriented in the same direction.

In this structure, the V-shaped groove 180 and the projection 123 disclosed in the foregoing first embodiment are not necessarily required.

This structure has an effect on preventing water from infiltration at many points, thereby making the water infiltration more difficult, and thus preventing water from infiltration without extensively changing a structure.

Figure 11:
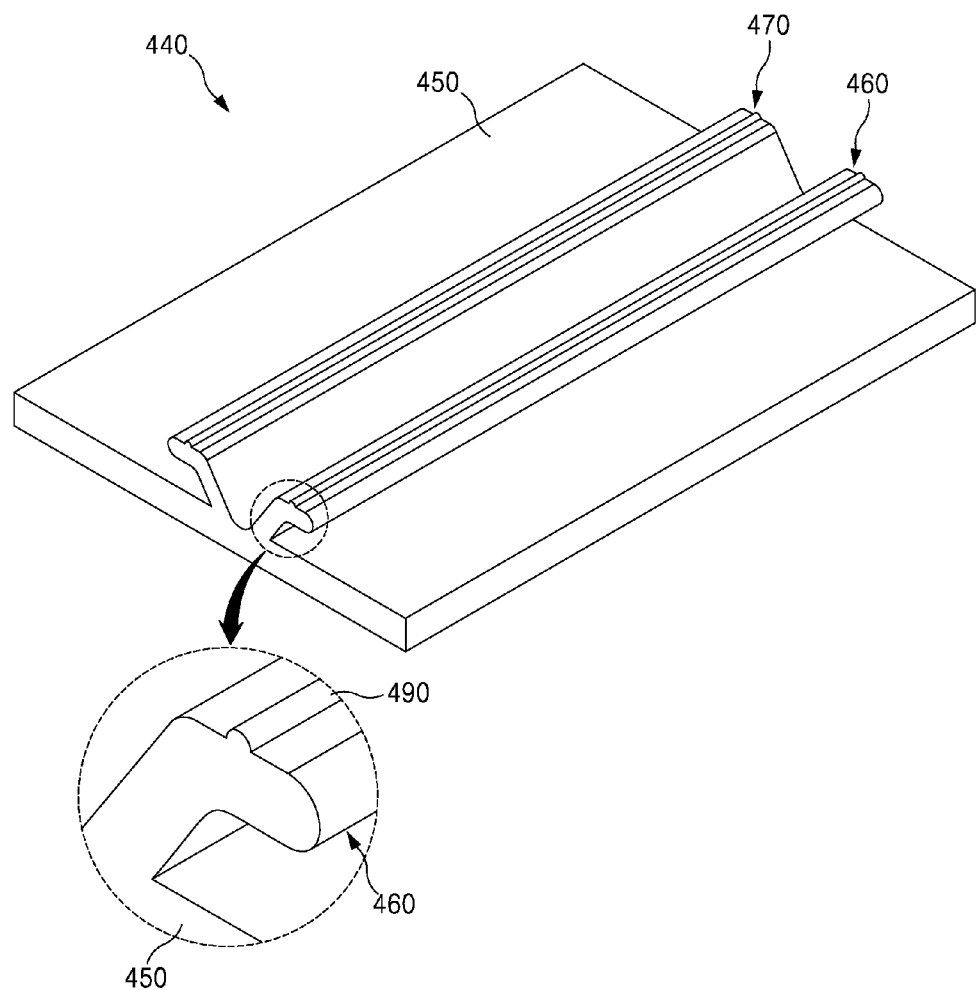
FIG. 11 is a partial cross-section view of waterproof packing for the mobile terminal according to a fourth embodiment of the present inventive concept.

FIG. 11 is a partial cross-section view of waterproof packing for the mobile terminal according to a fourth embodiment of the present inventive concept;

As shown therein, in a waterproof packing for the mobile terminal 440 according to an embodiment of the present inventive concept, each of a first waterproof wing 460 and a second waterproof wing 470 includes a semicircular projection rib 490 in an area to be in line-contact with the battery module 120 (see FIG. 1).

At this time, the semicircular projection rib 490 may be provided in both the first waterproof wing 460 and the second waterproof wing 470 as shown in FIG. 11, or only one of the first waterproof wing 460 and the second waterproof wing 470.

The semicircular projection rib 490 is in point-contact or line-contact with the battery module 120 when the battery module 120 is mounted, and therefore a gap with the battery module 120 is maximally reduced to thereby efficiently prevent water from infiltration.

With this structure, it is also possible to prevent water from infiltration without extensively changing a structure.

Figure 12:
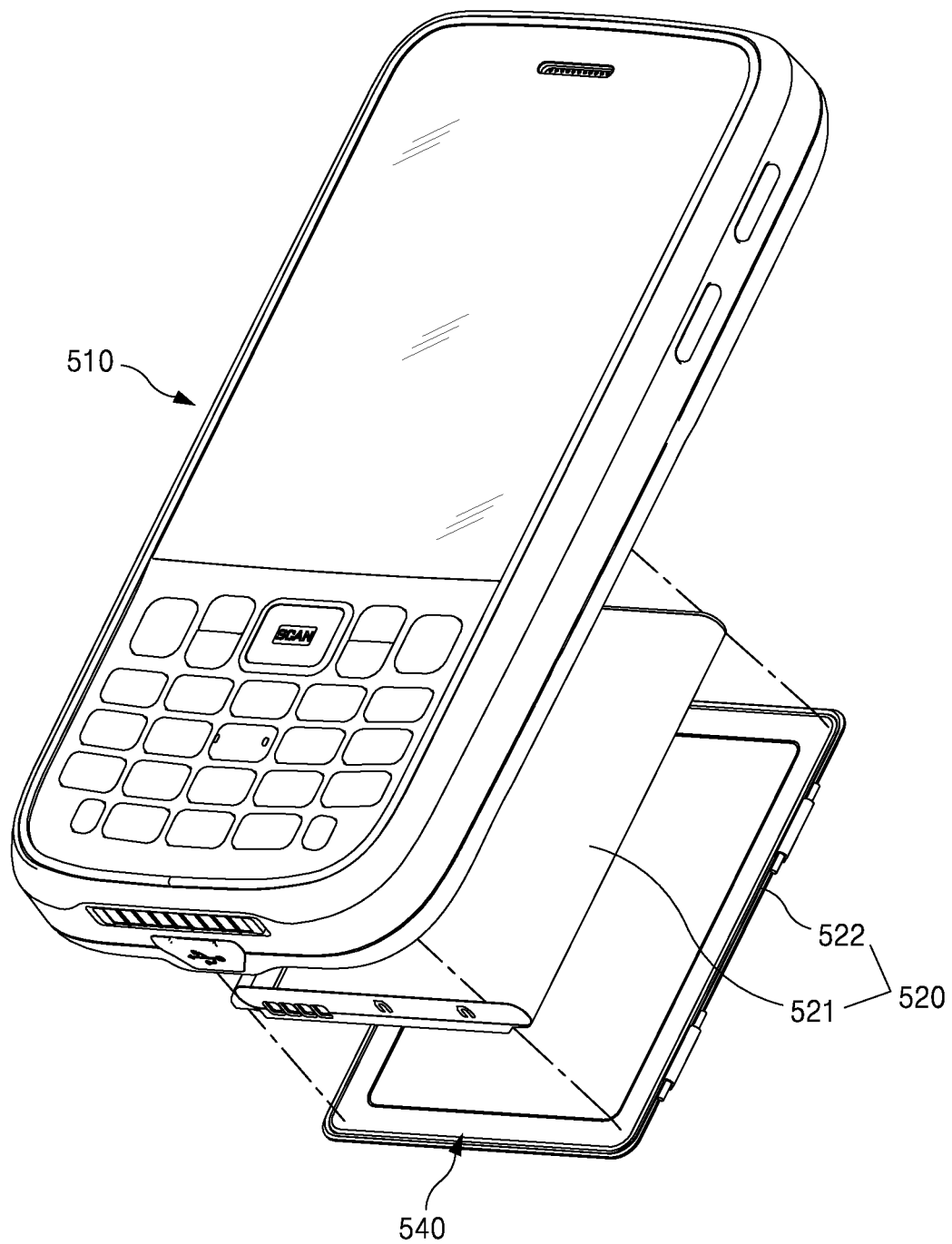
FIG. 12 is a partial cross-section view of waterproof packing for the mobile terminal according to a fifth embodiment of the present inventive concept.
Figure 13:
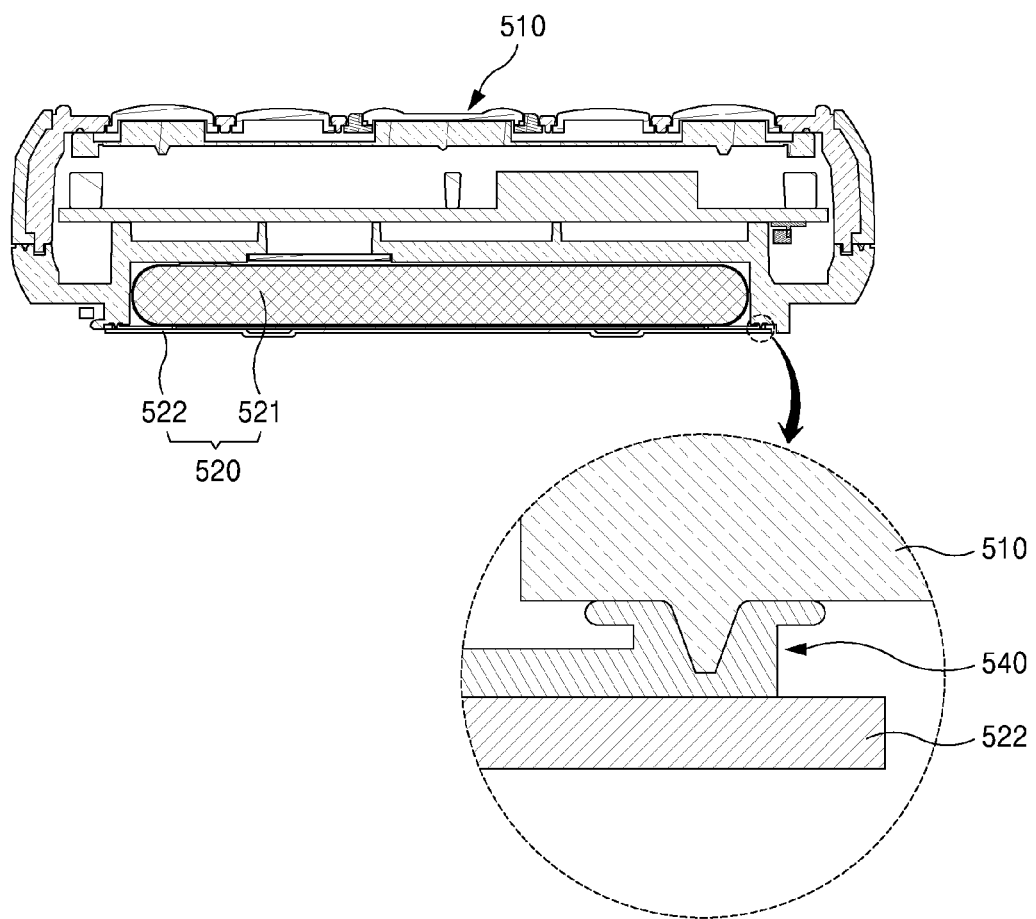
FIG. 13 is a cross-section view of FIG. 12.

FIG. 12 is a partial cross-section view of waterproof packing for the mobile terminal according to a fifth embodiment of the present inventive concept, and FIG. 13 is a cross-section view of FIG. 12.

In the foregoing first embodiment, the battery module 120 has the structure as shown in FIG. 1, in which the battery 121 and the battery support cover 122 are integrated as the terminal rear cover module 120.

However, a battery module 520 in this embodiment has a structure in which a battery 521 and a battery support cover 522 are separated and provided as a terminal rear cover module 520.

In other words, the mobile terminal may be assembled in such a manner that the battery 521 is inserted in a back of a terminal main body 510 and then the battery support cover 522 is coupled to the rear of the terminal main body 510.

Like this, a waterproof packing 540 for the mobile terminal is applicable even though the battery 521 and the battery support cover 522 are separated. At this time, a waterproof packing 540 for the mobile terminal may be coupled integrally with the battery support cover 522 as shown in FIG. 13. The structure and the opposite projection structure of the waterproof packing 540 for the mobile terminal are the same as those of the foregoing embodiments, and thus repetitive descriptions thereof will be avoided.

With this efficient structure, it is also possible to prevent water from infiltrating into the terminal main body 510 without extensively changing a structure.

According to an embodiment of the present inventive concept, it is possible to prevent water from infiltrating into the inside of the terminal main body through a gap between the terminal main body and the battery module by an efficient structure without extensively changing the structure.

While the inventive concept has been particularly shown and described with reference to exemplary embodiments thereof, it will be understood that various changes in form and details may be made therein without departing from the spirit and scope of the following claims.

What is claimed is:

1. A mobile terminal comprising:
   a terminal main body which comprises a plurality of internal components;
   a terminal rear cover module which is detachably coupled to a rear of the terminal main body and which forms the rear of the terminal main body; and
   a waterproof packing for the mobile terminal; which is arranged in between the terminal main body and the terminal rear cover module, the waterproof packing for the mobile terminal comprising:
   at least one first waterproof wing to prevent water from infiltrating into the terminal main body through a gap between the terminal main body and the terminal rear cover module; and
   a packing plate which is provided at one of the terminal main body and the terminal rear cover module, supports the first waterproof wing, and is continuously arranged long a circumferential direction of the terminal rear cover module;
   wherein the first waterproof wing comprises a first inclined pressing barrier inclined toward one side with respect to the packing plate, and compressed toward the packing plate and forming a barrier for preventing water infiltration when the terminal rear cover module is locked to the terminal main body; and
   wherein the first waterproof wing further comprises:
   a first flange type barrier arranged in parallel with the packing plate at an end of the first inclined pressing barrier and forming a barrier for preventing water infiltration; and
   wherein the waterproof packing for a mobile terminal further comprises at least one second waterproof wing connected to the packing plate and forming a barrier with respect to water passed by the first waterproof wing.

2. The mobile terminal according to claim 1, wherein the terminal rear cover module comprises a battery module which supplies power to internal components of the terminal main body.

3. The mobile terminal according to claim 2, wherein the battery module comprises: a battery which is inserted in a module mounting space formed in the rear of the terminal main body; and a battery support cover which is detachably coupled to the rear of the terminal main body, and supports the battery as being provided integrally with or separately from the battery.

4. The mobile terminal according to claim 1, wherein a seating groove for placing the packing plate is formed in a back of the terminal main body facing the terminal rear cover module.

5. The mobile terminal according to claim 1, wherein the packing plate is integrally coupled to a front of the terminal rear cover module facing the terminal main body.

6. The mobile terminal according to claim 1, wherein the second waterproof wing comprises a second inclined pressing barrier inclined toward the other side with respect to the packing plate, and compressed toward the packing plate and forming a barrier for preventing water infiltration when the terminal rear cover module is locked to the terminal man body; and
   a second flange type barrier arranged in parallel with the packing plate at an end of the second inclined pressing barrier and forming a barrier for preventing water infiltration.

7. The mobile terminal according to claim 1, wherein the first waterproof wing and the second waterproof wing are symmetrically arranged on the packing plate.

8. The mobile terminal according to claim 1, wherein a V-shaped groove is formed in between the first waterproof wing and the second waterproof wing, and a projection protrudes from one of the terminal main body and the terminal rear cover module and partially inserted in the V-shaped groove.

9. The mobile terminal according to claim 1, wherein at least one of the first waterproof wing and the second waterproof wing comprises at least one semicircular projection rib in an area thereof to be in line-contact with the terminal rear cover module.

10. The mobile terminal according to claim 1, wherein many first and second waterproof wings are arranged on the packing plate.

11. A waterproof packing for a mobile terminal, comprising:
   at least one first waterproof wing which is arranged between a terminal main body and a terminal rear cover module detachably coupled to a rear of the terminal main body and forming the rear of the terminal main body, and prevents water from infiltrating into the terminal main body through a gap between the terminal main body and the terminal rear cover module; and
   a packing plate which is provided at one of the terminal main body and the terminal rear cover module, supports the first waterproof wing, and is continuously arranged long a circumferential direction of the terminal rear cover module;
   wherein the first waterproof wing comprises a first inclined pressing barrier inclined toward one side with respect to the packing plate, and compressed toward the packing plate and forming a barrier for preventing water infiltration when the terminal rear cover module is looked to the terminal main body; and
   wherein the first waterproof wing further comprises:
   a first flange type barrier arranged in parallel with the packing plate at an end of the first inclined pressing barrier and forming a barrier for preventing water infiltration; and wherein the waterproof packing for a mobile terminal further comprises at least one second waterproof wing connected to the packing plate and forming a barrier with respect to water passed by the first waterproof wing.

12. The waterproof packing for a mobile terminal according to claim 11, wherein the terminal rear cover module comprises a battery module which supplies power to internal components of the terminal main body, the battery module comprising: a battery which is inserted in a module mounting space formed in the rear of the terminal main body; and
   a battery support cover which is detachably coupled to the rear of the terminal main body, and supports the battery as being provided integrally with or separately from the battery.

13. The waterproof packing for a mobile terminal according to claim 11, wherein the packing plate is integrally coupled to a front of the terminal rear cover module facing the terminal main body.

14. The waterproof packing for a mobile terminal according to claim 11, wherein the second waterproof wing comprises a second inclined pressing barrier inclined toward the other side with respect to the packing plate, and compressed toward the packing plate and forming a barrier for preventing water infiltration when the terminal rear cover module is locked to the terminal main body; and a second flange type barrier arranged in parallel with the packing plate at an end of the second inclined pressing barrier and forming a barrier for preventing water infiltration.

15. The waterproof packing for a mobile terminal according to claim 11, wherein the first waterproof wing and the second waterproof wing are symmetrically arranged on the packing plate, and a V-shaped groove is formed in between the first waterproof wing and the second waterproof wing and receives a projection protruding from a surface of one of the terminal main body and the terminal rear cover module.

\* \* \* \* \*